(12) United States Patent
Kondoh et al.

(10) Patent No.: US 6,465,740 B2  
(45) Date of Patent: Oct. 15, 2002

(54) GROMMET AND METHOD FOR FIXING SAID GROMMET TO A PANEL

(75) Inventors: Tatsuya Kondoh; Tsutomu Sakata; Yukimitsu Hattori, all of Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 4 days.

(21) Appl. No.: 09/736,239

(22) Filed: Dec. 15, 2000

(65) Prior Publication Data

US 2001/0020536 A1 Sep. 13, 2001

(30) Foreign Application Priority Data

Dec. 17, 1999 (JP) .......................... 11-359839

(51) Int. Cl.[7] .............................. H01B 17/26

(52) U.S. Cl. .............. 174/152 G; 174/153 G; 174/65 G

(58) Field of Search ............. 174/152 G, 152 R, 174/153 G, 65 R, 65 G; 16/2.1; 220/3.2

(56) References Cited

U.S. PATENT DOCUMENTS

| | | | | |
|---|---|---|---|---|
| 4,797,513 A | * | 1/1989 | Ono et al. | 174/153 G |
| 5,732,440 A | * | 3/1998 | Wright | 16/2.2 |
| 5,856,635 A | * | 1/1999 | Fujisawa et al. | 174/153 G |
| 5,981,877 A | * | 11/1999 | Sakata et al. | 174/153 G |
| 6,058,562 A | * | 5/2000 | Satou et al. | 16/2.1 |
| 6,088,874 A | * | 7/2000 | Nakata et al. | 16/2.1 |

FOREIGN PATENT DOCUMENTS

| | | | |
|---|---|---|---|
| JP | 5-32159 | * | 4/1993 |
| JP | 5-50629 | * | 7/1993 |

OTHER PUBLICATIONS

English language abstract for JP 5–32159, Apr. 27, 1993.*  
English language abstract for JP 5–50629, Jul. 2, 1993.*

* cited by examiner

*Primary Examiner*—Dean A. Reichard  
*Assistant Examiner*—W. David Walkenhorst  
(74) *Attorney, Agent, or Firm*—Greenblum & Bernstein, P.L.C.

(57) ABSTRACT

A grommet is provided that can be engaged in a through hole of the vehicle body panel by a single motion of pushing the grommet in only one direction. The grommet has a small diameter tubular part to tightly engage a wire harness inserted therein, an enlarged diameter part that continues from an end of the small diameter tubular part into the conical tubular shape, and a generally annular vehicle body engaging recess on the outer peripheral face of the enlarged diameter tubular part. The wall thickness of the enlarged diameter tubular part is approximately the same from the position of continuation with the small diameter tubular part to a bottom end of a first side wall of the vehicle body engaging recess. The first side wall is formed to have a turned-back portion from a tip of an inclined part that continues from the conical tubular shape to the bottom end to provide a space at the back face of the first side wall and an inclined part having an inclination is formed from a bottom face of the recess extending toward a second side wall of the recess. A thick wall forms a second side wall portion and a front end face of the enlarged diameter tubular part, and a lip projects from the second side wall toward the first side wall.

14 Claims, 6 Drawing Sheets

GROMMET AND METHOD FOR FIXING SAID GROMMET TO A PANEL

BACKGROUND OF THE INVENTION

1. Field of the Invention

The present invention relates to a grommet to be mounted on the wire harness for an automotive vehicle for fitting to a through hole of a vehicle body panel, and to a method for mounting the grommet onto a panel.

2. Discussion of Background Information

Conventionally, in laying the wire harness from the engine compartment into a passenger compartment, a grommet 1 of rubber or elastomer has been provided on the wire harness W/H, as shown in FIG. 4 and FIG. 5. The wire harness W/H is provided with the grommet 1 and is inserted into the through hole 3 of a vehicle body panel 2 separating the engine compartment (X) and the passenger compartment (Y). The grommet 1 is inserted into the periphery of the through hole 3, and is passed from the engine compartment side to the passenger compartment side through the through hole 3 and is positioned therein to prevent water or dust from entering into the passenger compartment from the engine compartment side The grommet 1 has a small diameter tubular part 1a which tightly engages around the wire harness W/H, and an enlarged diameter tubular part 1b which continues in a conical shape from an end of the small diameter tubular part 1a. A recess 1c for engaging the vehicle body is provided on the outer peripheral surface of the enlarged diameter tubular part 1b. The recess 1c is engaged in the through hole 3 of the vehicle body panel 2 to fit the grommet 1 to the vehicle body panel 2. In order to increase the engaging force at the time of the mounting, the part provided with the recess 1c for engagement with the vehicle body is formed into thick wall, and the recess 1c is formed to be deep.

The grommet 1 has conventionally been installed, as shown in FIG. 5, by being inserted from the engine compartment (X) to the passenger compartment (Y) through the through hole 3 from the enlarged diameter tubular part 1b side. To this end, the entire grommet 1 is pushed into the passenger compartment (Y), while inwardly deforming the outer peripheral parts having the recess 1c, which parts are larger in diameter than the inner diameter of the through hole 3. Thereafter, the wire harness W/H is pulled from the engine compartment (X) side, and the recess 1c is engaged in the through hole 3 to mount the grommet 1 to the vehicle body panel 2. In other words, by two motions of first pushing the grommet into the passenger compartment (Y) from the engine compartment (X), followed by pulling the grommet back into the engine compartment, mounting of the grommet 1 to the vehicle body panel 2 is performed. The reason the grommet is installed by first pushing in, and then pulling back again to have the recess 1c engage with the vehicle body panel 2, is because if pushing of the grommet in is made by inserting the surrounding wall 1e of large projection amount into the through hole, engagement of the periphery of the through hole 3 in the recess 1c between the peripheral wall 1f of small projection amount cannot be assured by good feel.

Recently, as a consequence of the sharp increase in the number of parts to be mounted in an automobile, often many parts are arranged on both sides of the vehicle body panel 2 near the position where the grommet 1 is mounted. As described above, in mounting the grommet 1 onto a vehicle body panel 2, first, the entire grommet 1 is pushed into the passenger compartment from the engine compartment side, in which case it has become difficult to provide sufficient space for receiving the grommet which has been pushed into the passenger compartment. In addition, since it has been the practice to pull the grommet back into the engine compartment, there has become less working space for pulling the wire harness W/H and grommet into the engine room side, even on the engine compartment side.

If, instead of the two motions of pushing and pulling as described above, a small diameter tubular part 1a of the grommet 1 is pushed into the through hole 3 as an insertion side from the engine compartment side and the recess 1c is engaged with the periphery of the through hole 3 as shown in FIG. 6, the grommet 1 can be mounted to the vehicle body panel 2 by a single pushing motion. In such a case, however, because the small diameter tubular part side A of the recess 1c is formed into a thick wall, intensive resistive forces act when passing the grommet through the through hole 3, and the insertion of the grommet cannot be easily performed. Furthermore, with the above method, as shown in FIG. 7, there is a tendency for a gap C to be formed between the wall surface 1c–1 on the front side of the recess 1c and the panel 2, which results in inferior water stopping performance.

SUMMARY OF THE INVENTION

The present invention has been made in the light of the problems described above, and an object of the present invention is to provide a grommet having a construction for mounting the grommet onto the vehicle body panel by a single motion of pushing in from the engine compartment side, and to a method for mounting the grommet.

In order to achieve the above object, the present invention provides a grommet formed, for example, of rubber or elastomer, and having a small diameter tubular part to tightly receive a wire harness inserted therein. An enlarged diameter part continues from an end of the small diameter tubular part into a conical tubular shape, and an annular vehicle body engaging recess is provided on the outer peripheral face of the enlarged diameter tubular part. The wall thickness of the enlarged diameter tubular part is configured to be approximately the same from the position of continuation with the small diameter tubular part to a bottom end of a first side wall of the vehicle body engaging recess. The first side wall is formed to have a turned-back portion from a tip of an inclined part that continues from the conical tubular shape to the bottom end to provide a space at the back face of the first side wall, and an inclined part having an inclination is formed from a bottom face of the recess extending toward a second side wall of the recess. Additionally, a thick wall portion forms a second side wall and a front end face of the enlarged diameter tubular part, and a lip projects from the second side wall toward the first side wall.

As described above, by forming the turned-back portion of the first side wall of the small diameter tubular part of the recess for engaging the vehicle body, a gap is provided on the back face of the first side wall. Thus, due to the thin wall of the first side wall, upon exertion an external force to the first side wall, the side wall is readily deformed, and upon release of the external force the first side wall is restored to its original condition and the first side wall projects outwardly. Accordingly, when the first side wall is passed through the through hole of the panel, the first side wall is pressed by the inner peripheral face of the through hole (in case the through hole is provided with a burring, by the burring) to inwardly deform the diameter, and the first side wall easily passes through the through hole. Also, because the first side wall is formed to have a thin wall and is inclined after passing through the through hole, the first side wall is pressed into tight contact with the panel toward the second side wall side, and the lip projecting from the second side wall side and the panel can be brought into tight contact with each other.

When the outermost end of the lip projects toward the small diameter tube side farther than the outer end position of the first sidewall, tight contact force between the lip and the panel can be increased, and improvement of the water stopping performance can be expected.

The grommet, under the condition of being fixedly mounted to the wire harness, is inserted into the through hole with burring of the vehicle body from the small diameter tube side, the first side wall is pressed by the burring so that the diameter is inwardly deformed to pass through the through hole of the vehicle body panel. After the first side wall is passed through the through hole, the first side wall is restored to its original condition, so that the periphery of the through hole of the vehicle body panel is engaged with the recess between the first side wall and the second side wall, by simply being pressed in. Thus, the grommet is mounted to the vehicle body panel by only a single motion.

Consequently, the grommet is mounted to the vehicle body panel by a single motion of pressing into the through hole with burring provided on the vehicle panel from the engine compartment side to the passenger compartment side. Accordingly, even when there is no space in either the engine compartment side or the passenger compartment side, the work of mounting the grommet to the vehicle body panel can be performed without any difficulties.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE PRESENT INVENTION

Figure 1:
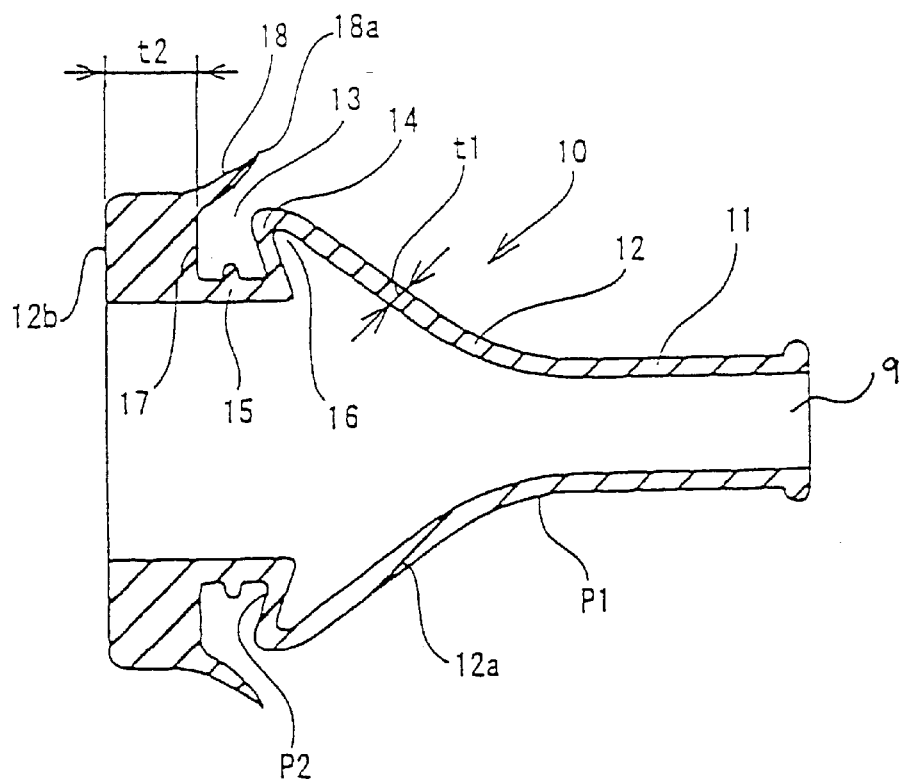
FIG. 1 is a sectional view of a grommet according to an embodiment of the present invention.
Figure 2:
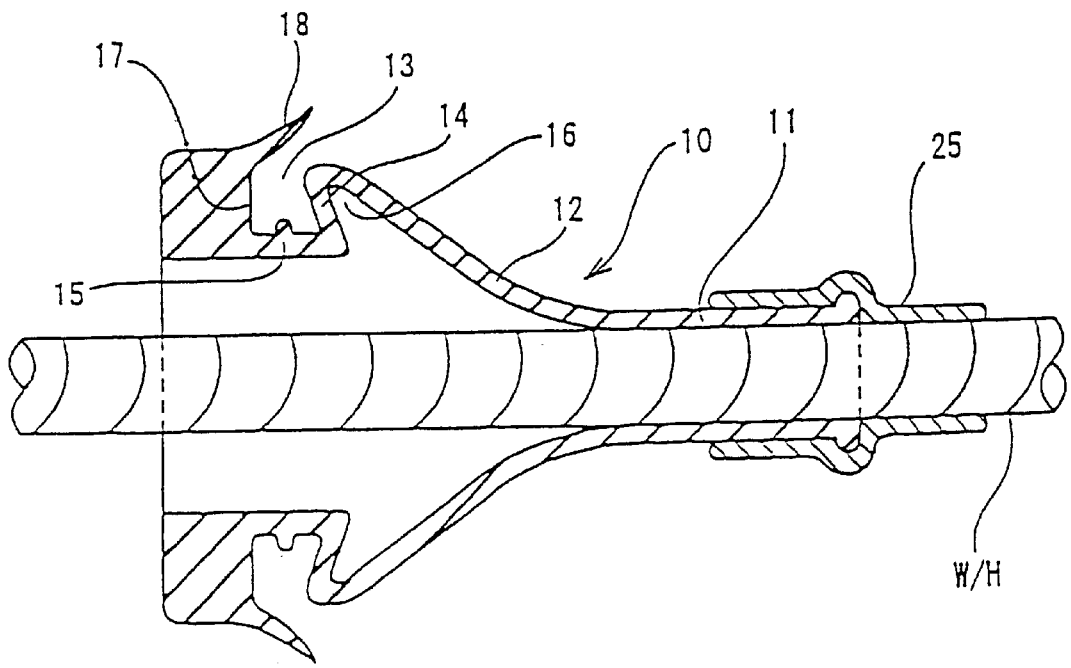
FIG. 2 is a sectional view of the grommet of FIG. 1 provided with a wire harness.
Figure 3A:
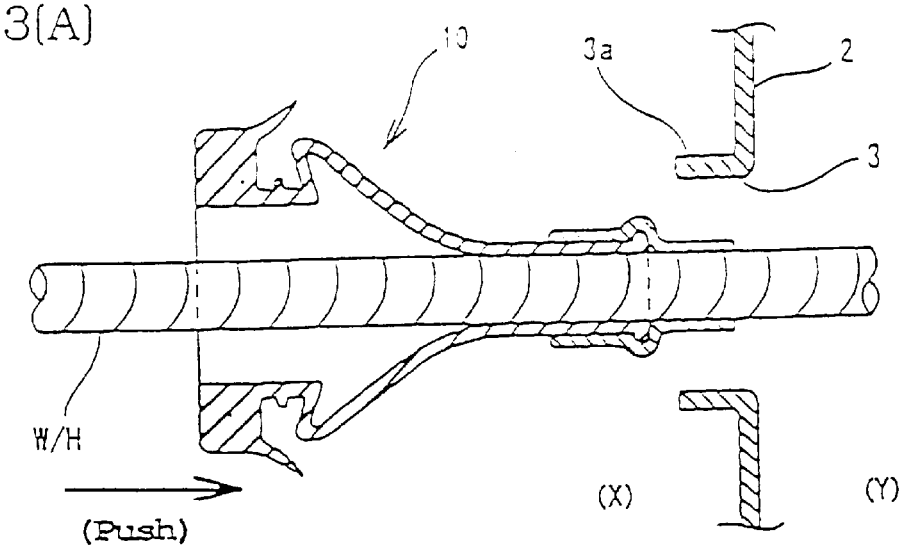
FIGS. 3(A) through 3(D) are the views showing the mounting of the grommet fixed to the wire harness through the through hole of the vehicle body panel to an engaged position.
Figure 3B:
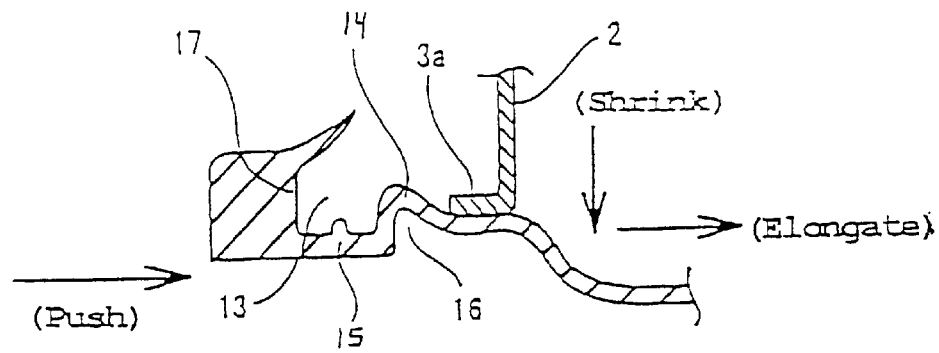
Figure 3C:
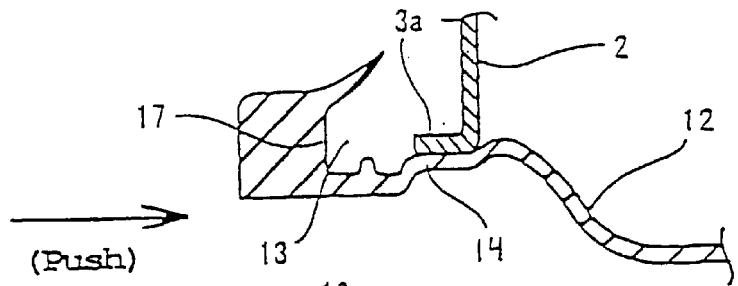
Figure 3D:
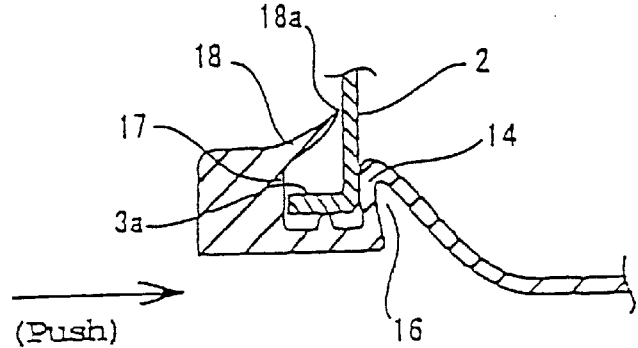
Figure 4:
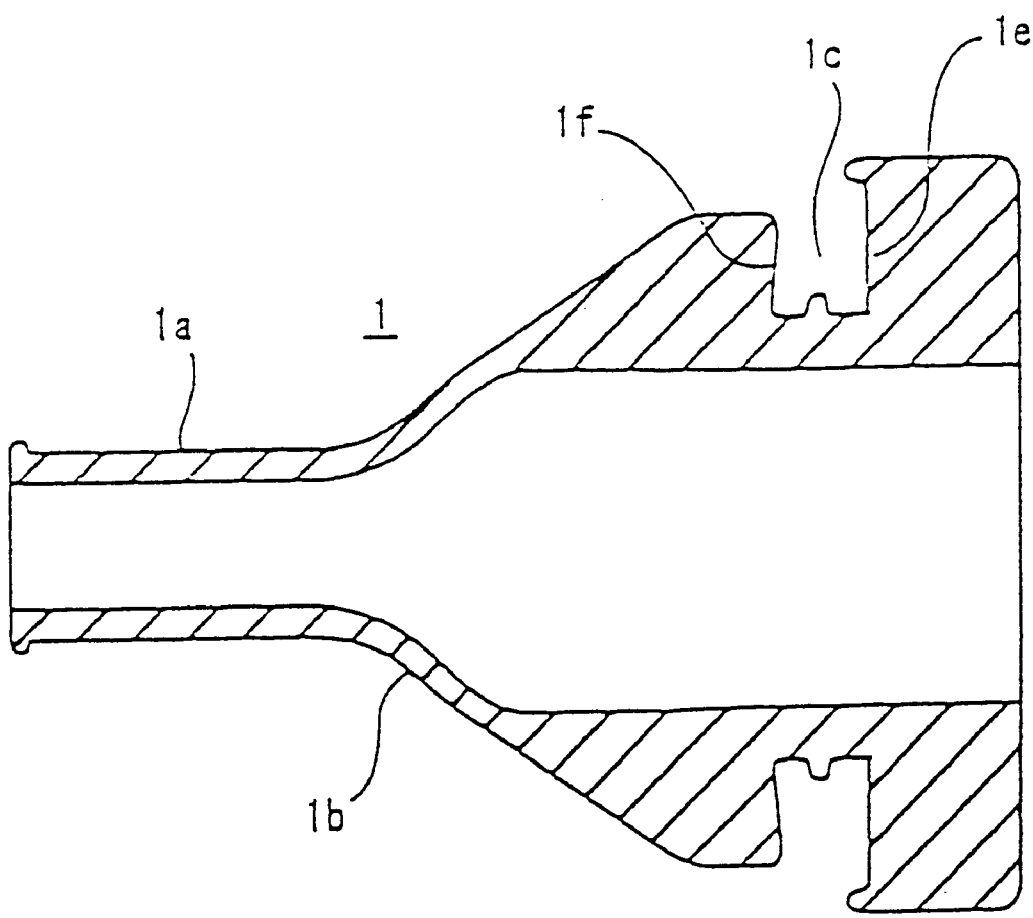
FIG. 4 is a sectional view showing a conventional grommet.
Figure 5A:
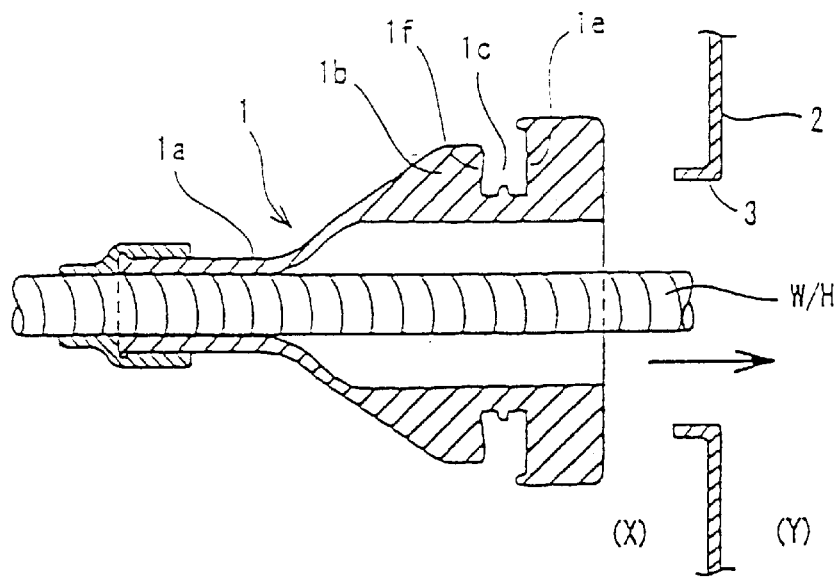
FIGS. 5(A) through 5(C) are views showing the mounting of the conventional grommet through the through hole of the vehicle body panel to an engaged position.
Figure 5B:
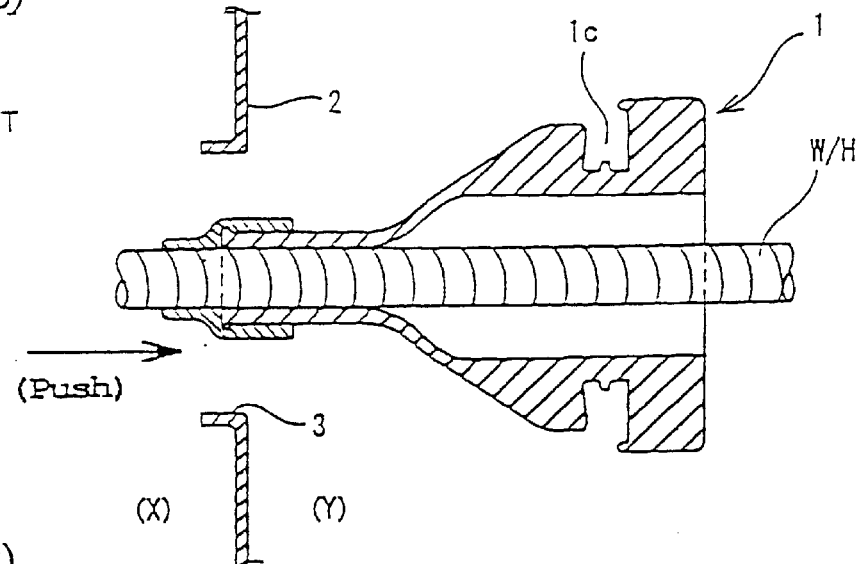
Figure 5C:
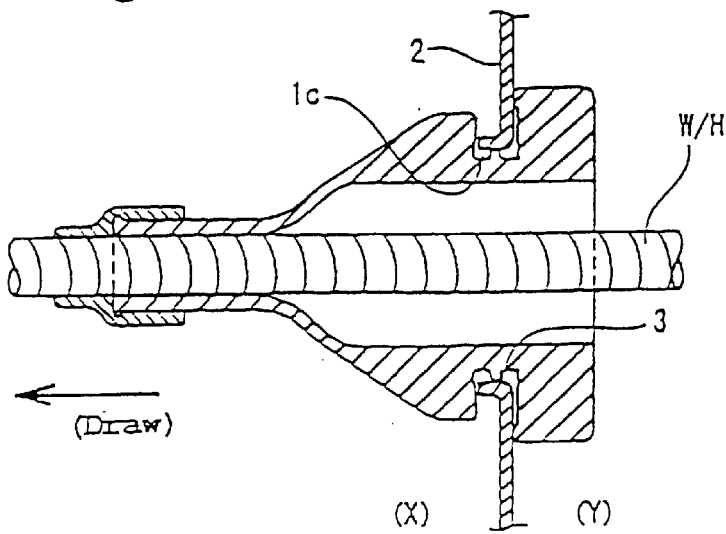
Figure 6:
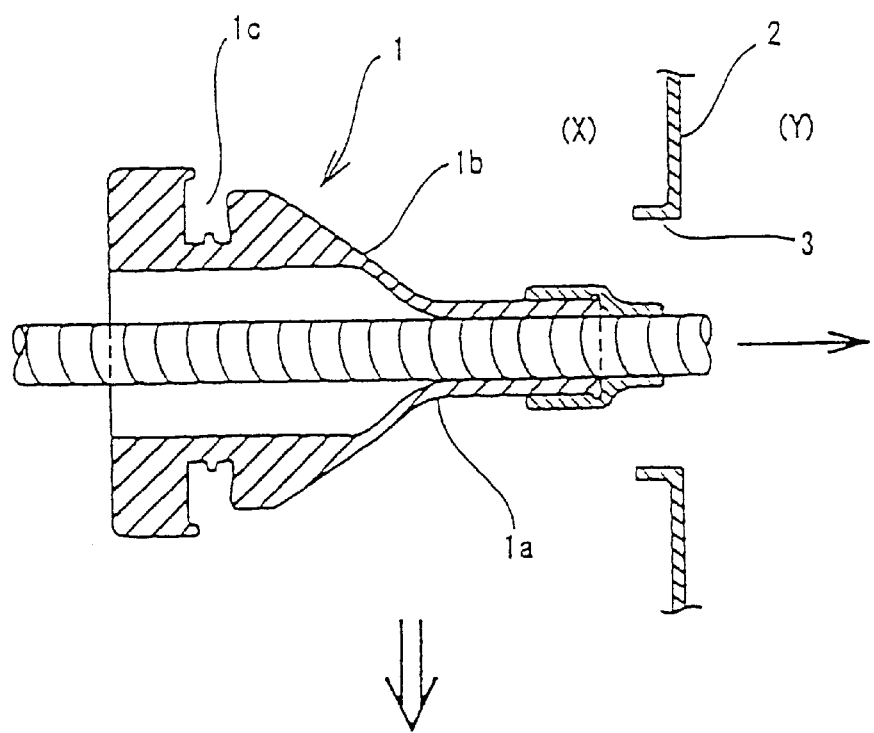
FIG. 6 depicts another conventional method of mounting a grommet to a vehicle body panel.
Figure 6:
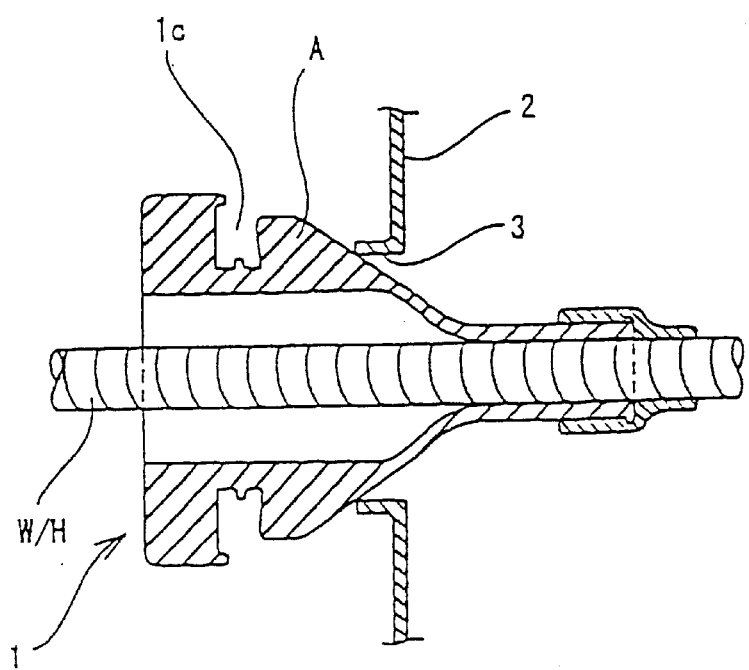
Figure 7:
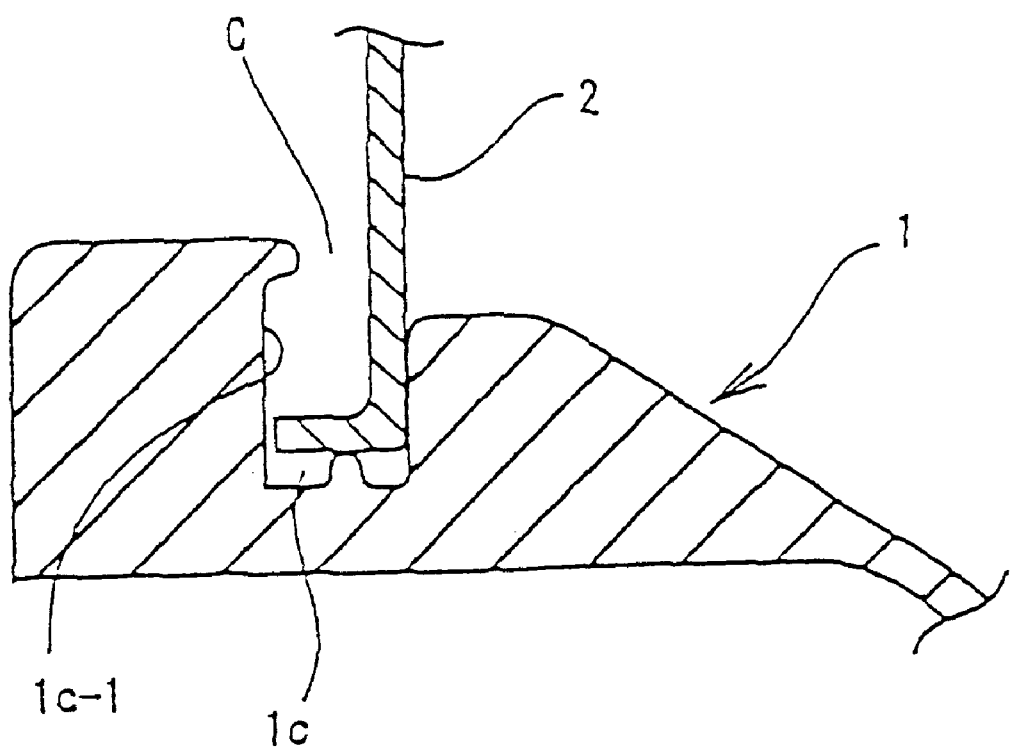
FIG. 7 is a view showing the deficiencies in the case where the grommet has been mounted by the method of FIG. 6.

FIGS. 1 through 3 show a first embodiment of the present invention, in which a grommet 10 is formed from any suitable material, for example, of rubber or elastomer. The grommet 10 includes a small diameter tubular part 11 to tightly receive a wire harness W/H when inserted therein, an enlarged diameter part 12 that continues from an end of the small diameter tubular part 11 into a generally conical tubular shape, and a generally annular vehicle body engaging recess 13 on the outer peripheral face of the enlarged diameter tubular part 12.

The wall thickness of the enlarged diameter tubular part 12 has approximately the same thin wall thickness t1 from the position P1 of the continuation with the small diameter tubular part 11 to the bottom face end P2 of the first side wall 14 of the enlarged diameter tubular part of the vehicle body engaging recess 13 through the enlarged diameter inclined part 12a. Furthermore, the first side wall 14 is formed to have a turned-back position, from the tip of inclined part 12a to the bottom face 15 of the recess 13, to provide a space 16 at the back of the first side wall 14. Also, the first sidewall 14 is formed to have an inclination from the bottom face 15 of the recess 13 to the tip of the inclined part 12a, toward the second sidewall 17 at the other side of the recess.

The area from the second side wall 17 to the front end face 12b of the enlarged diameter tubular part 12 forms a thick wall t2, and a lip 18 is formed to project from the front end of the second side wall 17 toward the first side wall 14 of the recess. The front-end 18a of the lip 18 projects farther toward the small diameter tube side than the outer end position of the first sidewall 14.

The grommet 10 having the above configuration is, as shown in FIG. 2, mounted on the wire harness W/H under the condition of the small diameter tubular part 11 being expanded by using an expansion jig (not illustrated), and is pulled out from the front end opening 9 of the enlarged diameter tubular part 12. A tape 25 is wrapped onto the tip of the small diameter tube 11 and the wire harness W/H.

In installing the wire harness W/H provided with the grommet 10 in an automotive vehicle, as shown in FIGS. 3(A)–3(D), the wire harness is passed through from the engine compartment (X) to the passenger compartment (Y) through the through hole 3 of the vehicle body panel 2. On the periphery of the through hole 3, a burring 3a projects toward the engine compartment (X). The burring may alternatively project toward the passenger compartment (Y) side.

The grommet 10 mounted on the wire harness W/H is, as illustrated, fixed to the wire harness W/H so that the insertion side becomes the small diameter tubular part 11, and thus it is inserted into the through hole 3 from the small diameter tubular part 11. During the insertion, when the grommet reaches the inclined part 12a of the enlarged diameter tubular part 12, because the outer diameter of the inclined part 12a becomes gradually larger than the inner diameter of the through hole 3 and the burring 3a, the grommet passes into the through hole while its inclined part 12a is constricted under pressure. When the first side wall 14 at the tip of the inclined part 12a engages the burring 3a, as illustrated, the first side wall 14 elongates toward the small diameter tube side while inwardly deforming by being pressed by the burring 3a, thus making it possible to have the first side wall 14 pass through the through hole 3 and the burring 3a, without requiring a large operating force.

When the first side wall 14 is released from the tip of the burring 3a, the first side wall 14 returns to its outwardly projecting condition, and the burring 3a and the panel 2 on the periphery of the through hole 3 are positioned in the recess 13 and engaged between the first side wall 14 and the second side wall 17. At this time, because the tip of the first side wall 14 projects toward the second side wall 17, the tip is in close contact with the passenger compartment face of the panel 2, and the lip 18 projecting from the second side wall 17 toward the first side wall 14 is in pressure contact with the engine compartment face of the panel 2.

As described above, by a single motion of pushing in the grommet 10 mounted on the wire harness W/H, the grommet 10 can be engaged in position in the through hole 3. Accordingly, in comparison with the conventional two-step operation of pushing and pulling (or drawing), the grommet mounting work is simplified, and even in the event of less space in the passenger compartment and on the engine compartment side, mounting of the grommet can be performed without problems.

As is clear from the above explanation, in the grommet of the present invention, the first side wall on the small diameter tubular part side of the recess for engaging with the vehicle body is made thin, and a space is provided on the back face of the recess. Accordingly, when the grommet is pushed into the through hole of the vehicle body panel from the first side wall, the diameter of the first side wall is readily inwardly deformed to pass through the through hole to provide easy mounting of the grommet to the panel. In this manner, by a single motion of simply pushing in the grommet, the grommet can be mounted in a through hole of the vehicle body panel, so that even in event that there is no space in the vicinity of the grommet mounting position, mounting of grommet can be smoothly performed. Further, as the mounting is accomplished by simply pushing in the grommet, workability of grommet mounting can be improved. In addition, a lip of the grommet can be reliably brought into pressure contact with the panel, and improved water stopping performance of the grommet can be expected.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in Japanese Patent Application No. 11-359839, filed on Dec. 17, 1999, which is expressly incorporated herein by reference in its entirety.

What is claimed is:

1. A grommet made of rubber or elastomer, and comprising a small diameter tubular part to tightly receive a wire harness inserted therein, an enlarged diameter part that continues from an end of said small diameter tubular part into a conical tubular shape, and a generally annular vehicle body engaging recess on an outer peripheral face of said enlarged diameter tubular part;

said vehicle body engaging recess having a first side wall, a bottom end and a second side wall facing said first side wall;

said first side wall being formed to have a turned-back portion from a tip of an inclined part that continues from said conical tubular shape to said bottom end to provide a space at a back face of said first side wall;

said inclined part having an inclination from a bottom face of said recess extending toward said second side wall of said recess; and a thick wall portion forming said second side wall and a front end face of said enlarged diameter tubular part.

2. The grommet according to claim 1, further comprising a lip projecting from said second side wall toward said first side wall, wherein said lip projects from an upper end of said second side wall.

3. The grommet according to claim 2, wherein a front end of the lip projects to the small diameter tubular part beyond an outer end position of the front side wall.

4. A method for mounting a grommet in a through hole having a burring of a vehicle body panel by a single motion of pushing said grommet into said opening, said method comprising:

providing a grommet according to claim 3 and mounting said grommet on a wire harness;

inserting said grommet into the through hole of the vehicle body panel from said small diameter tube side;

pressing said first side wall through the through hole of the vehicle body panel by inwardly deforming the diameter of said first side wall by engagement of said first side wall with the burring;

permitting said first side wall to return to its undeformed condition after passing through the through hole; and engaging a periphery of the through hole of the vehicle body panel with the recess between said first side wall and said second side wall.

5. A method for mounting a grommet in a through hole having a burring of a vehicle body panel by a single motion of pushing said grommet into said opening, said method comprising:

providing a grommet according to claim 2 and mounting said grommet on a wire harness;

inserting said grommet into the through hole of the vehicle body panel from said small diameter tube side;

pressing said first side wall through the through hole of the vehicle body panel by inwardly deforming the diameter of said first side wall by engagement of said first side wall with the burring;

permitting said first side wall to return to its undeformed condition after passing through the through hole; and engaging a periphery of the through hole of the vehicle body panel with the recess between said first side wall and said second side wall.

6. The grommet according to claim 2, wherein a front end of the lip projects to the small diameter tubular part beyond an outer end position of the front side wall.

7. A method for mounting a grommet in a through hole having a burring of a vehicle body panel by a single motion of pushing said grommet into said opening, said method comprising:

providing a grommet according to claim 1 and mounting said grommet on a wire harness;

inserting said grommet into the through hole of the vehicle body panel from said small diameter tube side;

pressing said first side wall through the through hole of the vehicle body panel by inwardly deforming the diameter of said first side wall by engagement of said first side wall with the burring;

permitting said first side wall to return to its undeformed condition after passing through the through hole; and engaging a periphery of the through hole of the vehicle body panel with the recess between said first side wall and said second side wall.

8. The grommet according to claim 1, wherein said enlarged diameter tubular part has a wall thickness that is approximately the same from the position of continuation with said small diameter tubular part to a bottom end of a first side wall of said vehicle body engaging recess.

9. A grommet made of rubber or elastomer comprising:

a small diameter tubular part to tightly receive a wire harness inserted therein;

an enlarged diameter part that continues from an end of said small diameter tubular part into a conical tubular shape;

a generally annular vehicle body engaging recess provided on an outer peripheral face of said enlarged diameter tubular part, said vehicle body engaging recess having a first side wall, a bottom end and a second side wall facing said first side wall and positioned farther away from said small diameter tubular part than said first side wall;

a recessed area being defined by an inner peripheral face side of said enlarged diameter tubular part and said first side wall, said recessed area extending at least beyond an inner surface of said bottom end toward said outer end of said first side wall, so that a diameter of said recessed area is greater than a diameter of said inner surface of said bottom end, whereby said first side wall can be readily pressed through a through hole of a vehicle body panel, thereby facilitating ready mounting of said grommet into the through hole of the vehicle body panel.

10. The grommet according to claim 9, wherein said recessed area is V-shaped.

11. The grommet according to claim 9, wherein said recessed area extends beyond an outer surface of said bottom end toward said outer end of said first side wall, so that the diameter of said recessed area is greater than a diameter of said outer surface of said bottom end.

12. The grommet according to claim 11, wherein said recessed area is an annular space that is V-shaped.

13. The grommet according to claim 12, wherein said first side wall is inclined toward said second side wall, wherein said recessed area has a shape that corresponds to an outline of said first side wall, and wherein said first side wall is thin.

14. A grommet made of rubber or elastomer comprising:

a small diameter tubular part arranged on one end of the grommet to tightly receive a wire harness inserted therein;

an enlarged diameter part arranged on another end of the grommet;

a conical tubular part connecting said small diameter tubular part to said enlarged diameter part;

a generally annular vehicle body engaging recess provided on an outer peripheral face of said enlarged diameter tubular part, said vehicle body engaging recess having a first side wall, a bottom end and a second side wall facing said first side wall;

an annular space being defined by an inner surface of said conical tubular part and said first side wall, said annular space having a diameter that is greater than a diameter of an inner surface of said bottom end, wherein said annular space changes shape when said conical tubular part is pressed through a through hole of a vehicle body panel, thereby facilitating ready mounting of said grommet into the through hole of the vehicle body panel.

* * * * *